United States Patent
Kotamraju et al.

(10) Patent No.: US 12,267,281 B2
(45) Date of Patent: Apr. 1, 2025

(54) COEXISTENCE OF NEW RADIO SOUNDING REFERENCE SIGNAL (NR-SRS) AND LONG-TERM EVOLUTION (LTE) COMMUNICATIONS

(71) Applicant: QUALCOMM Incorporated, San Diego, CA (US)

(72) Inventors: Saisruthi Kotamraju, Bengaluru (IN); Achaleshwar Sahai, Houston, TX (US); Timothy Paul Pals, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/759,456

(22) PCT Filed: Dec. 29, 2020

(86) PCT No.: PCT/US2020/067254
§ 371 (c)(1),
(2) Date: Jul. 26, 2022

(87) PCT Pub. No.: WO2021/173223
PCT Pub. Date: Sep. 2, 2021

(65) Prior Publication Data
US 2023/0055613 A1 Feb. 23, 2023

(30) Foreign Application Priority Data

Feb. 24, 2020 (IN) .............................. 202041007696

(51) Int. Cl.
*H04B 17/309* (2015.01)
*H04L 5/00* (2006.01)

(52) U.S. Cl.
CPC .......... *H04L 5/006* (2013.01); *H04B 17/309* (2015.01); *H04L 5/0048* (2013.01)

(58) Field of Classification Search
CPC ... H04B 17/309; H04B 7/0602; H04L 5/0023; H04L 5/0048; H04L 5/006; H04L 5/0073; H04W 88/06
See application file for complete search history.

(56) References Cited

U.S. PATENT DOCUMENTS 10,588,141 B2   3/2020   Rico Alvarino et al.
2006/0072524 A1   4/2006   Perahia et al.
(Continued)

FOREIGN PATENT DOCUMENTS

CA   3025808 A1   1/2018
EP   3657888 A1   5/2020
(Continued)

OTHER PUBLICATIONS

Huawei: et al., "Discussion on the Remaining Issues of Supporting Tx Switching Between Two Uplink Carriers", 3GPP Draft, 3GPP TSG RAN WG1 Meeting #100-e, R1-2001026, 3rd Generation Partnership Project (3GPP), Mobile Competence Centre, 650, Route Des Lucioles, F-06921 Sophia-Antipolis Cedex, France, vol. RAN WG1. No. Feb. 24, 2020-Mar. 6, 2020, Feb. 15, 2020 (Feb. 15, 2020), XP051853564, 8 Pages, Retrieved from the Internet: URL: https://ftp.3gpp.org/tsg_ran/WG1_RL1/TSGR1_100_e/Docs/R1-2001026.zip. R1-2001026. docx [retrieved on Feb. 15, 2020] pp. 3-6. 2 Discussion.
(Continued)

*Primary Examiner* — Melvin C Marcelo
*Assistant Examiner* — Natali Pascual Peguero
(74) *Attorney, Agent, or Firm* — Dalei Dong; Harrity & Harrity, LLP

(57) ABSTRACT

Various aspects of the present disclosure generally relate to wireless communication. In some aspects, a user equipment
(Continued)

(UE) may identify one or more symbols, associated with downlink communication of a first radio access technology (RAT), that are Impacted by antenna switching used to transmit an uplink reference signal of a second RAT. The UE may perform a mitigation action to mitigate downlink performance degradation associated with the first RAT based at least in part on identifying the one or more symbols. Numerous other aspects are described.

30 Claims, 7 Drawing Sheets

(56) References Cited

U.S. PATENT DOCUMENTS

| | | |
|---|---|---|
| 2011/0261673 A1 | 10/2011 | Luo et al. |
| 2013/0102254 A1 | 4/2013 | Cyzs et al. |
| 2017/0230875 A1 | 8/2017 | Tavildar et al. |
| 2018/0007707 A1* | 1/2018 | Rico Alvarino .. H04W 72/1263 |

FOREIGN PATENT DOCUMENTS

| | | |
|---|---|---|
| WO | 2018005481 | 1/2018 |
| WO | WO-2019017746 A1 | 1/2019 |

OTHER PUBLICATIONS

Huawei, et al., "Overview of Rel-17 Work Areas for NR and LTE", 3GPP TSG RAN Meeting #84, RP-191486, Overview of Rel-17 Work Areas for NR and LTE Final (WAS RP-191007), 3rd Generation Partnership Project (3GPP), Mobile Competence Centre, 650, Route Des Lucioles, F-06921, Sophia-Antipolis, vol. TSG RAN, No. Newport Beach, USA, Jun. 3, 2019-Jun. 6, 2019, Jun. 4, 2019 (Jun. 4, 2019), 22 Pages, May 29, 2019 (May 29, 2019, XP051748412, Retrieved from the Internet: URL: http://www.3gpp.org/ftp/Meetings%5F3GPP%5FSYNC/RAN/Docs/RP%2D191486%2Ezip [retrieved on Jun. 4, 2019], Section Mobility Enhancements, in Particular p. 13, the Paragraphs Below Figure 3, the whole document, Section "Mobility Enhancements", [retrieved on May 29, 2019] p. 12-p. 13, p. 16-p. 18, p. 16-p. 17, the whole document.
International Search Report and Written Opinion—PCT/US2020/067254—ISA/EPO—Apr. 21, 2021.

* cited by examiner

COEXISTENCE OF NEW RADIO SOUNDING REFERENCE SIGNAL (NR-SRS) AND LONG-TERM EVOLUTION (LTE) COMMUNICATIONS

CROSS-REFERENCE TO RELATED APPLICATIONS

This Patent Application is a 371 national stage of PCT Application No. PCT/US2020/067254 filed on Dec. 29, 2020, entitled "COEXISTENCE OF NEW RADIO SOUNDING REFERENCE SIGNAL (NR-SRS) AND LONG-TERM EVOLUTION (LTE) COMMUNICATIONS," which claims priority to India patent application No. 202041007696, filed on Feb. 24, 2020, entitled "COEXISTENCE OF NEW RADIO SOUNDING REFERENCE SIGNAL (NR-SRS) AND LONG-TERM EVOLUTION (LTE) COMMUNICATIONS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for coexistence of New Radio sounding reference signal and Long-Term Evolution communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying one or more symbols, associated with downlink communication of a first radio access technology (RAT), that are impacted by antenna switching used to transmit an uplink reference signal of a second RAT; and performing a mitigation action to mitigate downlink performance degradation associated with the first RAT based at least in part on identifying the one or more symbols.

In some aspects, the method includes identifying one or more antennas impacted by the antenna switching used to transmit the uplink reference signal of the second RAT; and wherein performing the mitigation action to mitigate downlink performance degradation associated with the first RAT further comprises performing the mitigation action for the one or more antennas.

In some aspects, performing the mitigation action to mitigate downlink performance degradation comprises blanking one or more samples received in the one or more symbols.

In some aspects, performing the mitigation action to mitigate downlink performance degradation comprises modifying a channel estimate that is based at least in part on the one or more symbols.

In some aspects, modifying the channel estimate comprises modifying one or more weights assigned to one or more time domain interpolation coefficients, used to generate the channel estimate, associated with the one or more symbols.

In some aspects, the one or more weights are each set to zero.

In some aspects, performing the mitigation action to mitigate downlink performance degradation comprises refraining from estimating noise in the one or more symbols.

In some aspects, the one or more symbols include at least one cell-specific reference signal (CRS) symbol; and wherein refraining from estimating noise in the one or more symbols comprises refraining from estimating noise in the at least one CRS symbol.

In some aspects, performing the mitigation action to mitigate downlink performance degradation comprises generating the channel estimate, using at least one of prediction, interpolation, or extrapolation, without using samples from the one or more symbols.

In some aspects, the one or more symbols include at least one CRS symbol; and wherein the channel estimate is generated using at least one of prediction, interpolation, or extrapolation, and without using samples from the one or more symbols based at least in part on a determination that the one or more symbols include the at least one CRS symbol.

In some aspects, the method includes identifying the mitigation action to be performed based at least in part on whether the one or more symbols include a cell-specific reference signal symbol.

In some aspects, performing the mitigation action to mitigate downlink performance degradation comprises at least one of: performing a first mitigation action to mitigate downlink performance degradation in one or more data symbols of the one or more symbols, performing a second mitigation action to mitigate downlink performance degradation in one or more cell-specific reference signal symbols of the one or more symbols, or a combination thereof.

In some aspects, the UE is configured to communicate in a dual connectivity mode associated with the first RAT and the second RAT.

In some aspects, a UE for wireless communication includes a memory; and one or more processors operatively coupled to the memory, the memory and the one or more processors configured to: identify one or more symbols, associated with downlink communication of a first RAT, that are impacted by antenna switching used to transmit an uplink reference signal of a second RAT; and perform a mitigation action to mitigate downlink performance degradation associated with the first RAT based at least in part on identifying the one or more symbols.

In some aspects, the one or more processors are further configured to identify one or more antennas impacted by the antenna switching used to transmit the second RAT; and wherein the one or more processors, when performing the mitigation action to mitigate downlink performance degradation associated with the first RAT, are configured to perform the mitigation action for the one or more antennas.

In some aspects, the one or more processors, when performing the mitigation action to mitigate downlink performance degradation, are configured to blank one or more samples received in the one or more symbols.

In some aspects, the one or more processors, when performing the mitigation action to mitigate downlink performance degradation, are configured to modify a channel estimate that is based at least in part on the one or more symbols.

In some aspects, the one or more processors, when modifying the channel estimate, are configured to modify one or more weights assigned to one or more time domain interpolation coefficients, used to generate the channel estimate, associated with the one or more symbols.

In some aspects, the one or more weights are each set to zero.

In some aspects, the one or more processors, when performing the mitigation action to mitigate downlink performance degradation, are configured to refrain from estimating noise in the one or more symbols.

In some aspects, the one or more symbols include at least one CRS symbol; and wherein the one or more processors, when refraining from estimating noise in the one or more symbols, are configured to refrain from estimating noise in the at least one CRS symbol.

In some aspects, the one or more processors, when performing the mitigation action to mitigate downlink performance degradation, are configured to generate the channel estimate, using at least one of prediction, interpolation, or extrapolation, without using samples from the one or more symbols.

In some aspects, the one or more symbols include at least one CRS symbol; and wherein the channel estimate is generated using at least one of prediction, interpolation, or extrapolation, and without using samples from the one or more symbols based at least in part on a determination that the one or more symbols include the at least one CRS symbol.

In some aspects, the one or more processors are further configured to identify the mitigation action to be performed based at least in part on whether the one or more symbols include a cell-specific reference signal symbol.

In some aspects, the one or more processors, when performing the mitigation action to mitigate downlink performance degradation, are configured to: perform a first mitigation action to mitigate downlink performance degradation in one or more data symbols of the one or more symbols, perform a second mitigation action to mitigate downlink performance degradation in one or more cell-specific reference signal symbols of the one or more symbols, or a combination thereof.

In some aspects, the UE is configured to communicate in a dual connectivity mode associated with the first RAT and the second RAT.

In some aspects, a non-transitory computer-readable medium storing a set of instructions for wireless communication includes one or more instructions that, when executed by one or more processors of a user equipment (UE), cause the UE to: identify one or more symbols, associated with downlink communication of a first radio access technology (RAT), that are impacted by antenna switching used to transmit an uplink reference signal of a second RAT using antenna switching; and perform a mitigation action to mitigate downlink performance degradation associated with the first RAT based at least in part on identifying the one or more symbols.

In some aspects, the one or more instructions further cause the UE to identify one or more antennas impacted by the antenna switching used to transmit the uplink reference signal of the second RAT; and wherein the one or more instructions, that cause the UE to perform the mitigation action to mitigate downlink performance degradation associated with the first RAT, cause the UE to perform the mitigation action for the one or more antennas.

In some aspects, the one or more instructions, that cause the UE to perform the mitigation action to mitigate downlink performance degradation, cause the UE to blank one or more samples received in the one or more symbols.

In some aspects, the one or more instructions, that cause the UE to perform the mitigation action to mitigate downlink performance degradation, cause the UE to modify a channel estimate that is based at least in part on the one or more symbols.

In some aspects, the one or more instructions, that cause the UE to modify the channel estimate, cause the UE to modify one or more weights assigned to one or more time domain interpolation coefficients, used to generate the channel estimate, associated with the one or more symbols.

In some aspects, the one or more weights are each set to zero.

In some aspects, the one or more instructions, that cause the UE to perform the mitigation action to mitigate downlink performance degradation, cause the UE to refrain from estimating noise in the one or more symbols.

In some aspects, the one or more symbols include at least one CRS symbol; and wherein the one or more instructions, that cause the UE to refrain from estimating noise in the one or more symbols, cause the UE to refrain from estimating noise in the at least one CRS symbol.

In some aspects, the one or more instructions, that cause the UE to perform the mitigation action to mitigate downlink performance degradation, cause the UE to generate the channel estimate, using at least one of prediction, interpolation, or extrapolation, without using samples from the one or more symbols.

In some aspects, the one or more symbols include at least one CRS symbol; and wherein the channel estimate is generated using at least one of prediction, interpolation, or extrapolation, and without using samples from the one or more symbols based at least in part on a determination that the one or more symbols include the at least one CRS symbol.

In some aspects, the one or more instructions further cause the UE to identify the mitigation action to be performed based at least in part on whether the one or more symbols include a cell-specific reference signal symbol.

In some aspects, the one or more instructions, that cause the UE to perform the mitigation action to mitigate downlink performance degradation, cause the UE to: perform a first mitigation action to mitigate downlink performance degradation in one or more data symbols of the one or more symbols, perform a second mitigation action to mitigate downlink performance degradation in one or more cell-specific reference signal symbols of the one or more symbols, or a combination thereof.

In some aspects, the UE is configured to communicate in a dual connectivity mode associated with the first RAT and the second RAT.

In some aspects, an apparatus for wireless communication includes means for identifying one or more symbols, associated with downlink communication of a RAT, that are impacted by antenna switching used to transmit an uplink reference signal of a second RAT; and means for performing a mitigation action to mitigate downlink performance degradation associated with the first RAT based at least in part on identifying the one or more symbols.

In some aspects, the apparatus includes means for identifying one or more antennas impacted by the antenna switching used to transmit the uplink reference signal of the second RAT; and wherein the means for performing the mitigation action to mitigate downlink performance degradation associated with the first RAT further comprises means for performing the mitigation action for the one or more antennas.

In some aspects, the means for performing the mitigation action to mitigate downlink performance degradation comprises means for blanking one or more samples received in the one or more symbols.

In some aspects, the means for performing the mitigation action to mitigate downlink performance degradation comprises means for modifying a channel estimate that is based at least in part on the one or more symbols.

In some aspects, the means for modifying the channel estimate comprises means for modifying one or more weights assigned to one or more time domain interpolation coefficients, used to generate the channel estimate, associated with the one or more symbols.

In some aspects, the one or more weights are each set to zero.

In some aspects, the means for performing the mitigation action to mitigate downlink performance degradation comprises means for refraining from estimating noise in the one or more symbols.

In some aspects, the one or more symbols include at least one CRS symbol; and wherein the means for refraining from estimating noise in the one or more symbols comprises means for refraining from estimating noise in the at least one CRS symbol.

In some aspects, the means for performing the mitigation action to mitigate downlink performance degradation comprises means for generating the channel estimate, using at least one of prediction, interpolation, or extrapolation, without using samples from the one or more symbols.

In some aspects, the one or more symbols include at least one CRS symbol; and wherein the channel estimate is generated using at least one of prediction, interpolation, or extrapolation, and without using samples from the one or more symbols based at least in part on a determination that the one or more symbols include the at least one CRS symbol.

In some aspects, the apparatus includes means for identifying the mitigation action to be performed based at least in part on whether the one or more symbols include a cell-specific reference signal symbol.

In some aspects, the means for performing the mitigation action to mitigate downlink performance degradation comprises at least one of: means for performing a first mitigation action to mitigate downlink performance degradation in one or more data symbols of the one or more symbols, means for performing a second mitigation action to mitigate downlink performance degradation in one or more cell-specific reference signal symbols of the one or more symbols, or a combination thereof.

In some aspects, the apparatus is configured to communicate in a dual connectivity mode associated with the first RAT and the second RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
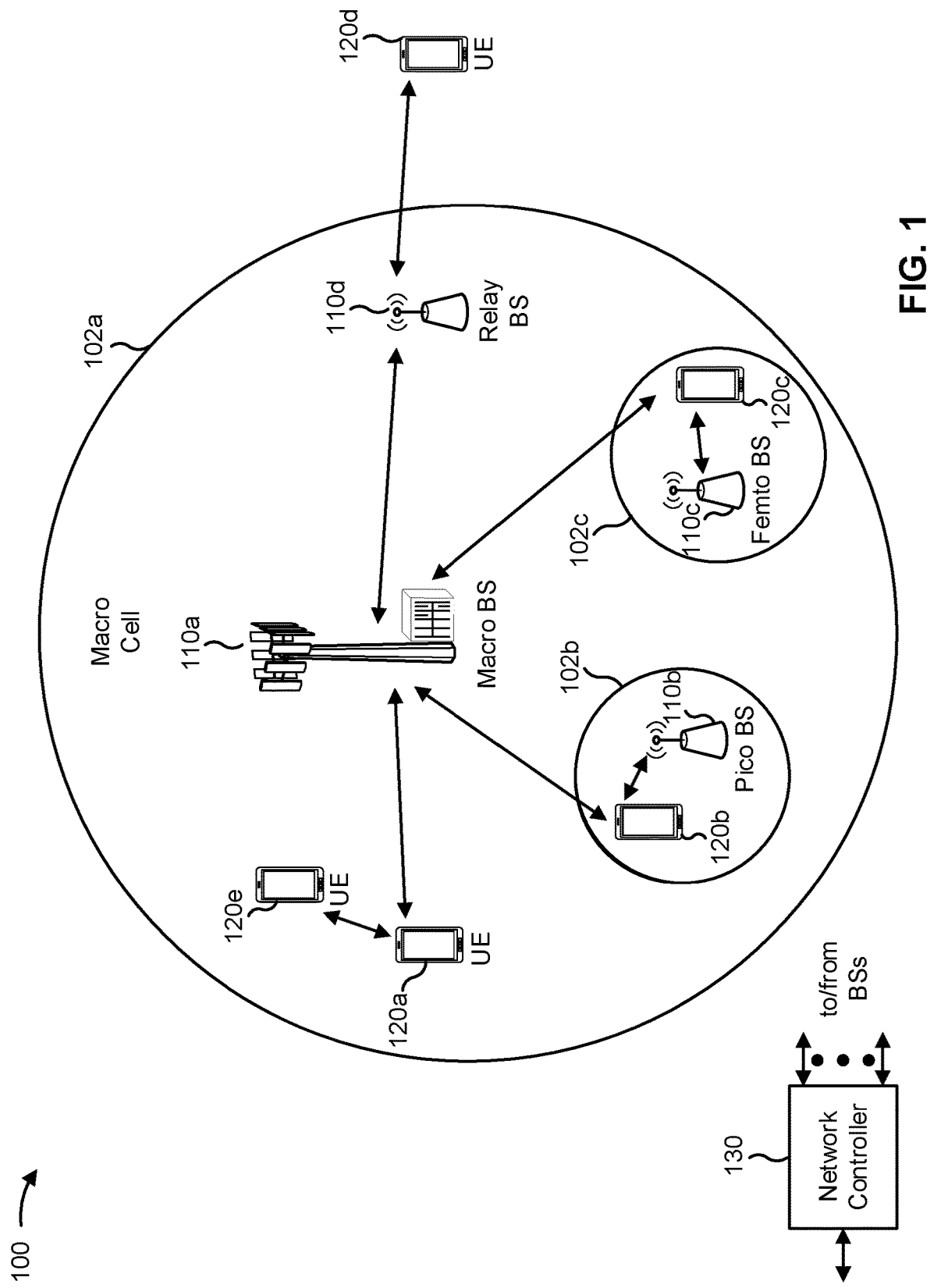
- FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
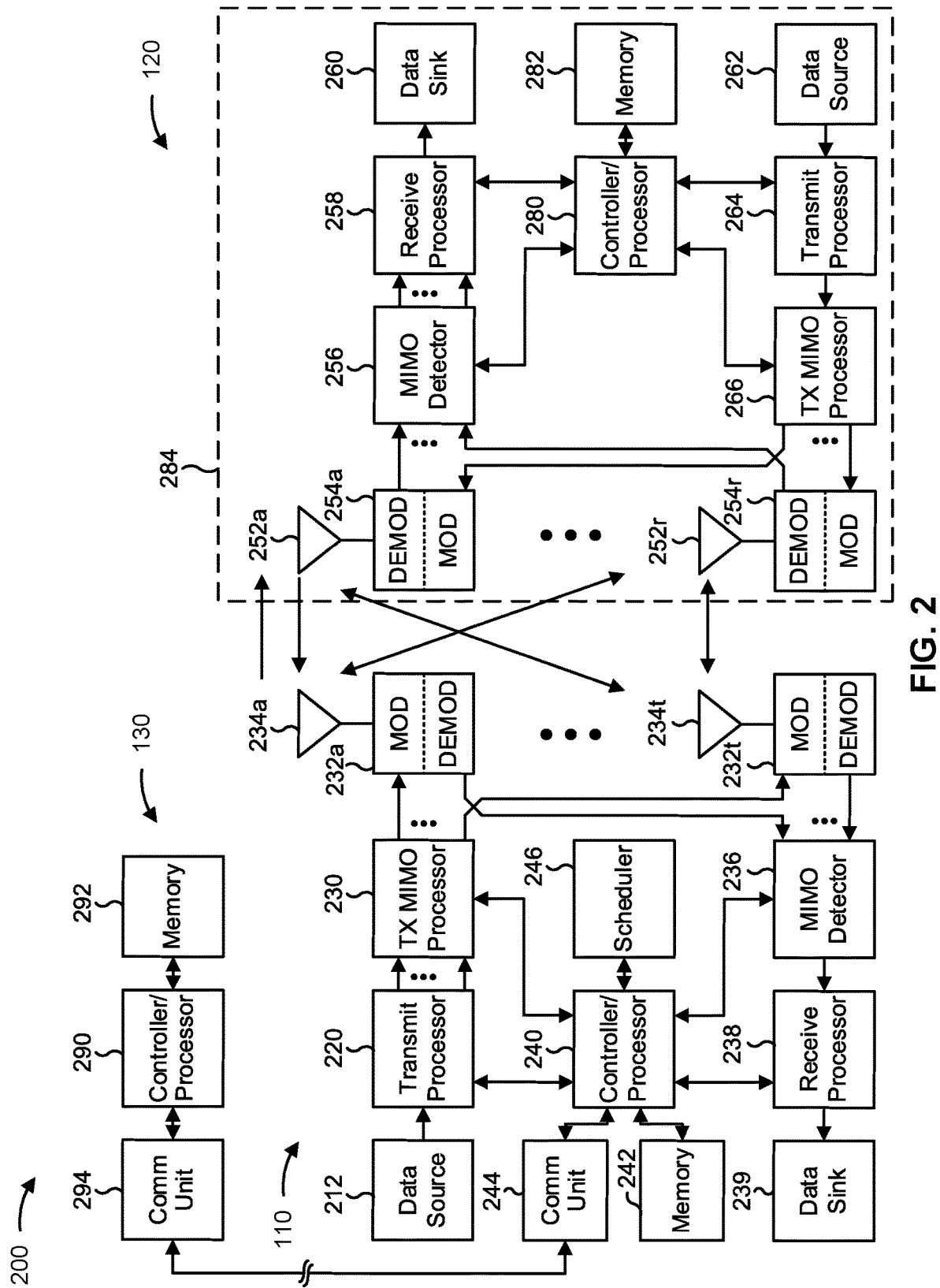
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with coexistence of NR sounding reference signal and LTE communications, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions.

In some aspects, the UE includes means for identifying one or more symbols, associated with downlink communication of a first radio access technology (RAT), that are impacted by antenna switching used to transmit an uplink reference signal of a second RAT; or means for performing a mitigation action to mitigate downlink performance degradation associated with the first RAT based at least in part on identifying the one or more symbols. The means for UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for identifying one or more antennas impacted by the antenna switching used to transmit the uplink reference signal of the second RAT. In some aspects, the UE includes means for identifying the mitigation action to be performed based at least in part on whether the one or more symbols include a cell-specific reference signal symbol. In some aspects, the UE includes means for performing a first mitigation action to mitigate downlink performance degradation in one or more data symbols of the one or more symbols, means for performing a second mitigation action to mitigate downlink performance degradation in one or more cell-specific reference signal symbols of the one or more symbols, or As indicated above, FIG. 2 is provided as an example. Other examples may differ from what is described with regard to FIG. 2.

Figure 3:
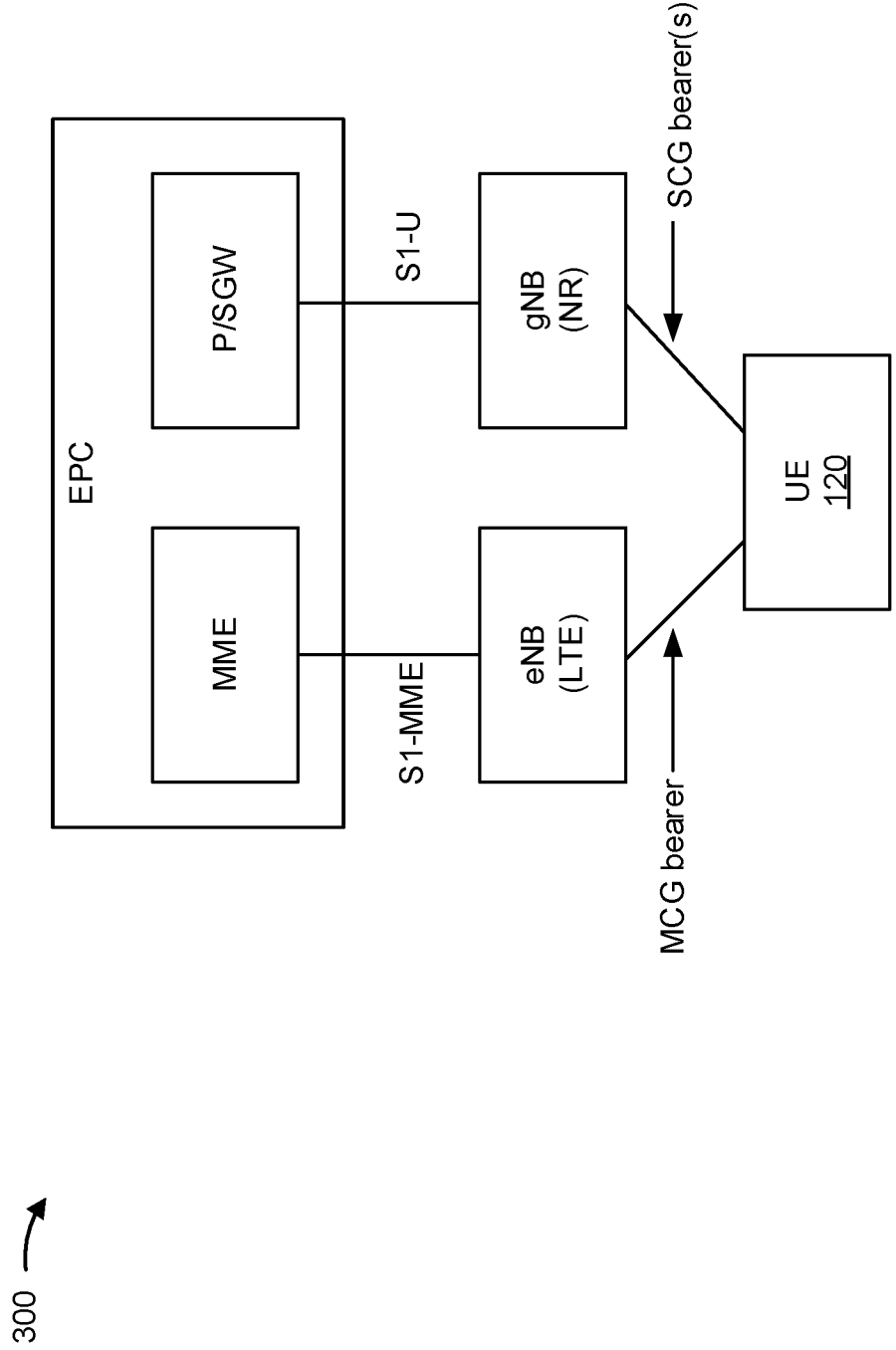
FIG. 3 is a diagram illustrating an example of dual connectivity, in accordance with various aspects of the present disclosure.

FIG. 3 is a diagram illustrating an example 300 of dual connectivity, in accordance with various aspects of the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT. In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
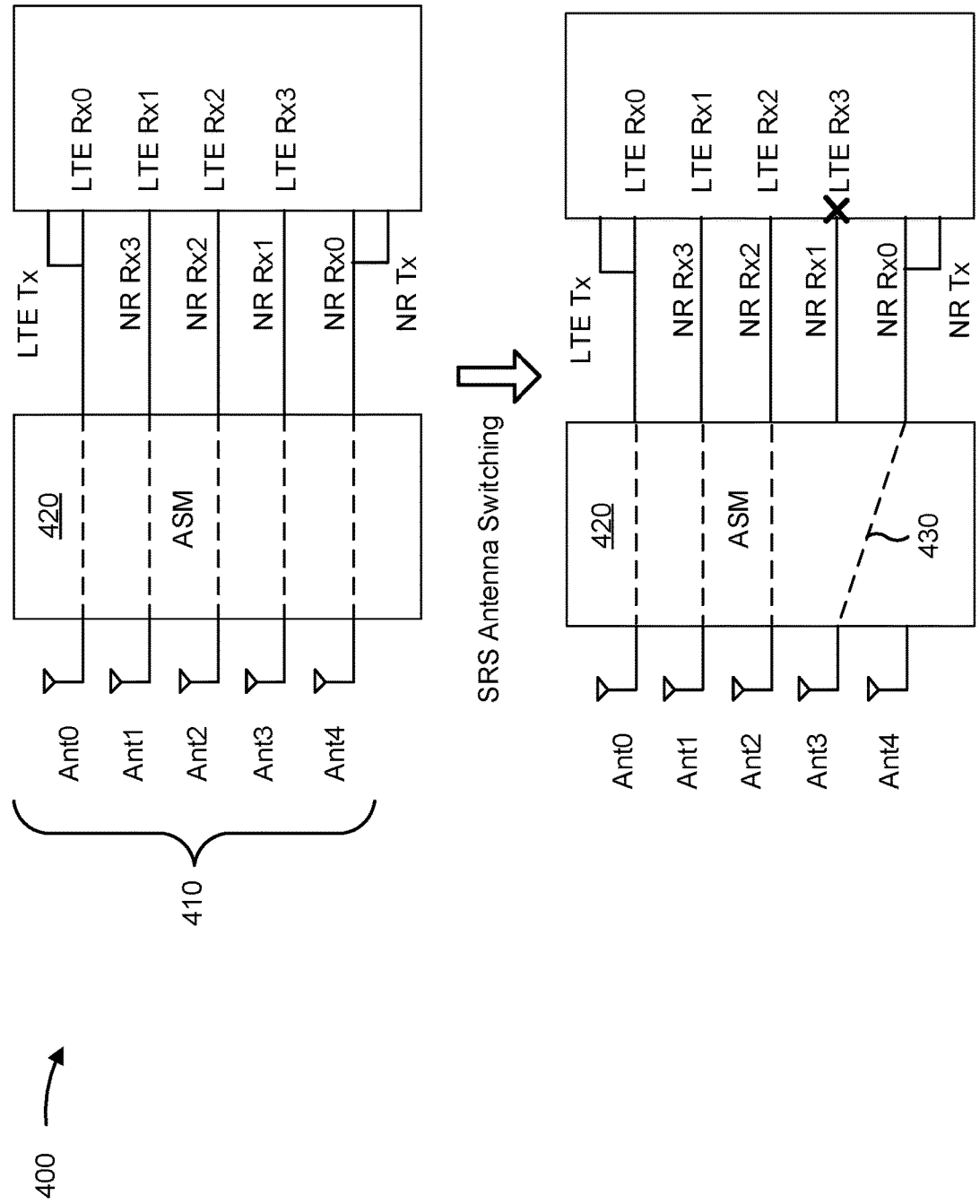
FIG. 4 is a diagram illustrating an example of antenna switching in a dual connectivity mode, in accordance with various aspects of the present disclosure.

FIG. 4 is a diagram illustrating an example 400 of antenna switching in a dual connectivity mode, in accordance with various aspects of the present disclosure. FIG. 4 shows an example of antenna switching for a UE 120 with five antennas (e.g., a first, second, third, fourth, and fifth antenna, shown as Ant0, Ant1, Ant2, Ant3, and Ant4). In some examples, a UE 120 may have a different number of antennas, such as four antennas. FIG. 4 also shows an example of antenna switching for transmission of a sounding reference signal (SRS). In some aspects, the techniques and apparatuses described herein may be applied when a UE 120 performs antenna switching for an operation other than SRS transmission. Furthermore, although FIG. 4 shows antenna switching in a dual connectivity mode associated with an LTE RAT (more generally, a first RAT) and an NR RAT (more generally, a second RAT), operations described herein apply to other combinations of the first RAT and the second RAT).

As shown by reference number 410, a UE 120 may include multiple antennas (e.g., antennas 252, described above in connection with FIG. 2), shown as five antennas in example 400. An antenna may be used for transmission and/or reception of signals for one or more RATs. In example 400, Ant0 is used for transmission on an LTE RAT (shown as LTE Tx) and reception on the LTE RAT (shown as LTE Rx0). In some aspects, the transmission and reception on Ant0 are not concurrent or simultaneous. As further shown, Ant1 is used for both reception on the LTE RAT (shown as LTE Rx1) and reception on the NR RAT (shown as NR Rx3), Ant2 is used for both reception on the LTE RAT (shown as LTE Rx2) and reception on the NR RAT (shown as NR Rx2), and Ant3 is used for both reception on the LTE RAT (shown as LTE Rx3) and reception on the NR RAT (shown as NR Rx1). In some aspects, reception on different RATs is not concurrent or simultaneous. As further shown, Ant4 is used for transmission on the NR RAT (shown as NR Tx) and reception on the NR RAT (shown as NR Rx0). In some aspects, the transmission and reception on Ant4 are not concurrent or simultaneous.

In a dual connectivity mode between the LTE RAT and the NR RAT, such as an ENDC mode, both the LTE RAT and the NR RAT are active at the same time. However, to reduce UE manufacturing costs and support a small form factor, a UE 120 may not have enough antennas to dedicate (e.g., orthogonalize) each antenna to only the LTE RAT or to only the NR RAT. As a result, the UE 120 may need to share antennas between the LTE RAT and the NR RAT, such that a particular antenna is used for the LTE RAT at one time and for the NR RAT at another time. This antenna sharing is particularly applicable to multiple-input multiple-output (MIMO) communications, where data is communicated simultaneously on multiple data streams (or MIMO layers), and the multiple data streams are received simultaneously by the UE 120 via different antennas (e.g., one data stream per antenna).

When communicating using the NR RAT, a UE 120 may be required and/or configured to transmit SRSs to sound a channel so that a base station 110 can estimate the channel. For example, the base station 110 may perform channel estimation based at least in part on one or more SRSs received from the UE 120. The NR RAT supports a variety of SRS configurations, such as a "1T4R" configuration in which SRSs are transmitted for four NR antennas (e.g., to sound all four antennas) and a "1T2R" configuration in which SRSs are transmitted for two NR antennas (e.g., to sound two out of four antennas). The NR RAT also supports periodic SRS transmission (e.g., configured in a radio resource control (RRC) message) and aperiodic SRS transmission (e.g., triggered by downlink control information (DCI)).

As shown by reference number 420, the UE 120 may include an antenna switching module (ASM). The ASM may include various switches, wires, and/or buses that enable the ASM (and the UE 120) to switch an antenna from an LTE receive chain to an NR transmit chain (or from being connected to an LTE receive chain to being open-circuited), and vice versa. A receive chain may include a set of components (e.g., a demodulator, a de-interleaver, a MIMO detector, an analog-to-digital converter, and/or a receive processor) that enable the UE 120 to process received communications (e.g., from an analog form to a digital form). A transmit chain may include a set of components (e.g., a modulator, an interleaver, a Tx MIMO processor, a digital-to-analog converter, and/or a transmit processor) that enable the UE 120 to process communications for transmission (e.g., from a digital form to an analog form).

As shown by reference number 430, in example 400, the ASM switches Ant3 from being connected to an LTE receive chain (shown as LTE Rx3) to an NR transmit chain (shown as NR Tx). In example 400, the ASM switches Ant3 to the NR transmit chain to sound Ant3 (e.g., to transmit one or more SRSs using Ant3). If Ant3 was being used to receive LTE communications (e.g., was active for LTE downlink communications), then this antenna switching of Ant3 degrades LTE performance (e.g., degrades performance of downlink communications on the LTE RAT). For example, the UE 120 may fail to receive one or more downlink communications and/or a portion of a downlink communication (e.g., in one or more time domain resources, such as one or more symbols) of the LTE RAT. In some examples (e.g., for a sub-carrier spacing of 30 kilohertz), SRS antenna switching for NR SRS transmission may interrupt one or two downlink symbols of the LTE RAT. This may negatively impact downlink performance of the LTE RAT, such as by reducing throughput and/or by introducing communication errors.

Some techniques and apparatuses described herein mitigate this downlink performance degradation on the LTE RAT that is a result of antenna switching (e.g., for transmission of NR SRS in a dual connectivity mode, such as ENDC). As a result, these techniques and apparatuses may improve performance of LTE downlink communications in an ENDC mode, such as by increasing throughput and/or reducing communication errors.

As indicated above, FIG. 4 is provided as an example. Other examples may differ from what is described with respect to FIG. 4.

Figure 5:
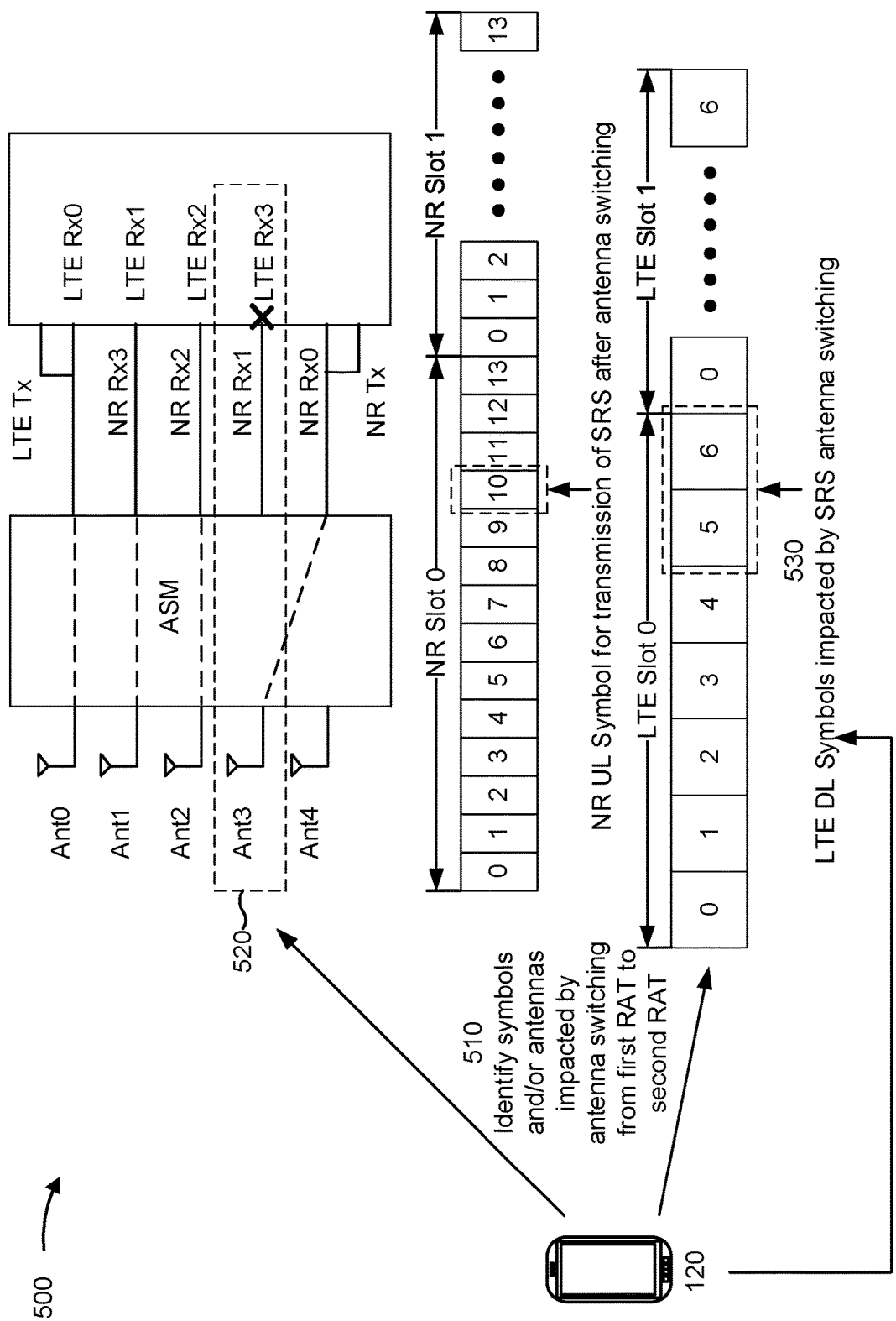
FIG. 5 is a diagram illustrating an example associated with coexistence of New Radio (NR) sounding reference signal and Long-Term Evolution (LTE) communications, in accordance with various aspects of the present disclosure.

FIG. 5 is a diagram illustrating an example 500 of coexistence of NR sounding reference signal and LTE communications, in accordance with various aspects of the present disclosure.

As shown by reference number 510, a UE 120 may identify one or more symbols and/or one or more antennas impacted by antenna switching from a first RAT to a second RAT. In some aspects, the first RAT may be an LTE RAT and the second RAT may be an NR RAT. In some aspects, the UE 120 may perform the antenna switching to transmit an uplink reference signal, such as an SRS, of the second RAT. The one or more symbols and/or the one or more antennas may be associated with downlink communication of the first RAT. For example, the UE 120 may be scheduled to receive one or more downlink communications of the first RAT in the one or more symbols. A symbol is a time domain resource in wireless communication (e.g., in a wireless RAT, such as LTE and/or NR) that is a portion of a slot, which is another time domain resource in wireless communication. Similarly, the UE 120 may be scheduled and/or configured to receive the one or more downlink communications of the first RAT using the one or more antennas. In some aspects, the UE 120 is configured to communicate in a dual connectivity mode (e.g., ENDC or another dual connectivity mode) using the first RAT and the second RAT.

As shown by reference number 520, the UE 120 may perform antenna switching, as described above in connection with FIG. 4. In example 500, the UE 120 (e.g., using an antenna switching module) switches an antenna, shown as Ant3, from an LTE receive chain to an NR transmit chain. In some aspects, the UE 120 may switch a different antenna or a different number of antennas (e.g., more than one antenna). In this example, the UE 120 identifies the antenna that is switched ("Ant3") as being impacted by the antenna switching.

As shown by reference number 530, the UE 120 identifies that LTE downlink symbols 5 and 6 in LTE slot 0 (e.g., an LTE symbol having a symbol index value of 5 and an LTE symbol having a symbol index value of 6 in an LTE slot having a slot index value of 0) are impacted by the antenna switching. In some aspects, the UE 120 may identify one or more impacted LTE symbols that are concurrent with (e.g., overlap partially with or overlap entirely with) one or more NR symbols in which one or more SRSs are to be transmitted (e.g., shown as NR uplink symbol 10 in NR slot 0). Additionally, or alternatively, the UE 120 may identify one or more impacted LTE symbols in which the UE 120 is unable to receive a downlink communication on the first RAT (e.g., the LTE RAT) due to switching between antennas (e.g., for transmission of one or more SRSs on one or more NR symbols). Thus, a symbol identified by the UE 120 as being impacted by antenna switching for SRS transmission may include a symbol of the first RAT that is concurrent with a symbol of the second RAT in which the UE 120 is to transmit an SRS, and/or may include a symbol of the first RAT in which the UE 120 is unable to receive a downlink communication of the first RAT (e.g., an LTE downlink communication) due to switching an antenna to or from a transmit chain of the second RAT (e.g., the NR transmit chain) to enable transmission of the SRS. The UE 120 may transmit one or more SRSs in one or more symbols of the second RAT and using an antenna after performing antenna switching of the antenna.

As shown by reference number 540, the UE 120 may mitigate downlink performance degradation of the first RAT in the one or more impacted symbols and/or for the impacted antenna. To mitigate downlink performance degradation, the UE 120 may perform one or more mitigation actions described below.

In some aspects, a mitigation action may include blanking one or more samples received in the one or more symbols (e.g., and via the one or more antennas) identified by the UE 120 as being impacted by the antenna switching. For example, the UE 120 may blank one or more samples received via an impacted antenna and in an impacted symbol. In some aspects, blanking a sample may include zeroing out the sample, dropping the sample, disregarding the sample, discarding the sample, or refraining from using the sample to interpret a signal received (e.g., in the symbol). The UE 120 may perform this blanking using a digital component of the UE 120 (e.g., a digital baseband component) and/or an analog component of the UE 120 (e.g., an analog radio frequency component). In some aspects, the UE 120 may select the mitigation action of blanking regardless of whether the impacted symbol is a data symbol (e.g., that carries data on a data channel, such as a physical downlink shared channel (PDSCH)) or a cell-specific reference signal (CRS) symbol (e.g., that carries a CRS). By blanking samples in symbols impacted by antenna switching, the UE 120 avoids inaccuracies associated with those samples (e.g., due to a downlink communication not being received during the impacted symbols), thereby mitigating downlink performance degradation.

Additionally, or alternatively, the mitigation action may include modifying a channel estimate that is based at least in part on the one or more symbols identified by the UE 120 as being impacted by the antenna switching. For example, the UE 120 may modify the channel estimate for one or more antennas and/or one or more symbols impacted by the antenna switching. In some aspects, the UE 120 may modify the channel estimate for an antenna and a symbol based at least in part on zeroing out a channel estimate for the antenna and the symbol. In some aspects, the UE 120 may zero out the channel estimate for a symbol by modifying a weight assigned to a time domain interpolation coefficient, used to generate the channel estimate, associated with the symbol. For example, the UE 120 may assign a weight of zero to the time domain interpolation coefficient associated with the impacted symbol and/or the impacted antenna. In some aspects, the UE 120 may select the mitigation action of modifying the channel estimate for an impacted symbol based at least in part on a determination that the impacted symbol is a data symbol. Additionally, or alternatively, the UE 120 may select the mitigation action of modifying the channel estimate for an impacted symbol based at least in part on a determination that the impacted symbol is a CRS symbol. By modifying a channel estimate for symbols impacted by antenna switching as described above, the UE 120 can improve accuracy of the channel estimate, thereby mitigating downlink performance degradation due to a more accurate channel estimate for downlink communications.

Additionally, or alternatively, the mitigation action may include refraining from estimating noise in the one or more symbols impacted by the antenna switching. For example, the UE 120 may refrain from estimating noise for one or more antennas and/or one or more symbols impacted by the antenna switching. In some aspects, the UE 120 may select the mitigation action of refraining from estimating noise for an impacted symbol based at least in part on a determination that the impacted symbol is a CRS symbol (e.g., and not a data symbol), The UE 120 may use a CRS to estimate noise and/or a channel, and may use that estimate when interpreting received data symbols. When the CRS is not received in an impacted symbol (e.g., due to antenna switching and/or blanking of a sample, as described above), then noise received in the impacted symbol will not be an accurate reflection of noise on the data symbols. Thus, refraining from estimating noise in the CRS symbol improves accuracy of a channel estimate for a data symbol.

Additionally, or alternatively, the mitigation action may include generating (e.g., predicting, interpolating, and/or extrapolating) a channel estimate without using samples from the one or more impacted symbols. For example, the UE 120 may generate a channel estimate for an impacted antenna without using samples from one or more symbols impacted by the antenna switching. In some aspects, the UE 120 may predict, interpolate, and/or extrapolate the channel estimate without using raw samples from the impacted symbols, such as by predicting the channel estimate entirely using a minimum mean square error (MMSE) channel estimation technique without using the raw samples. In some aspects, the UE 120 may select the mitigation action of determining the channel estimate without using samples from impacted symbols based at least in part on a determination that the impacted symbol is a CRS symbol (e.g., and not a data symbol). As a result, the UE 120 can improve accuracy of a channel estimate by not accounting for samples that include inaccuracies (e.g., due to lack of reception in the impacted symbols).

As indicated above, in some aspects, the UE 120 may identify and/or select a mitigation action (or multiple mitigation actions) to be performed for a symbol based at least in part on whether the symbol is a data symbol or a CRS symbol. For example, all of the mitigation techniques described above (e.g., blanking samples, modifying a channel estimate, refraining from estimating noise, and determining a channel estimate without using samples from impacted symbols) may be applied by the UE 120 to CRS symbols. In some aspects, only blanking samples and modifying a channel estimate (e.g., and not refraining from estimating noise or determining a channel estimate without using samples from impacted symbols) may be applied by the UE 120 to data symbols. In some aspects, the UE 120 may perform more than one of the mitigation actions described above for an impacted symbol (and antenna) and/or set of symbols (and set of antennas).

In some aspects, the UE 120 may perform different mitigation actions for data symbols as compared to CRS symbols. For example, the UE 120 may perform a first mitigation action or a first set of mitigation actions (e.g., a first set of one or more mitigation actions) to a data symbol (e.g., in a set of impacted symbols), and may perform a second mitigation action or a second set of mitigation actions (e.g., a second set of one or more mitigation actions) to a CRS symbol (e.g., in a set of impacted symbols). In some aspects, the first mitigation action and/or the first set of mitigation actions is different from the second mitigation action and/or the second set of mitigation actions. However, in some aspects, the UE 120 may perform the same mitigation action on a data symbol and a CRS symbol to mitigate downlink performance degradation while reducing complexity of such mitigation.

As indicated above, FIG. 5 is provided as an example. Other examples may differ from what is described with respect to FIG. 5.

Figure 6:
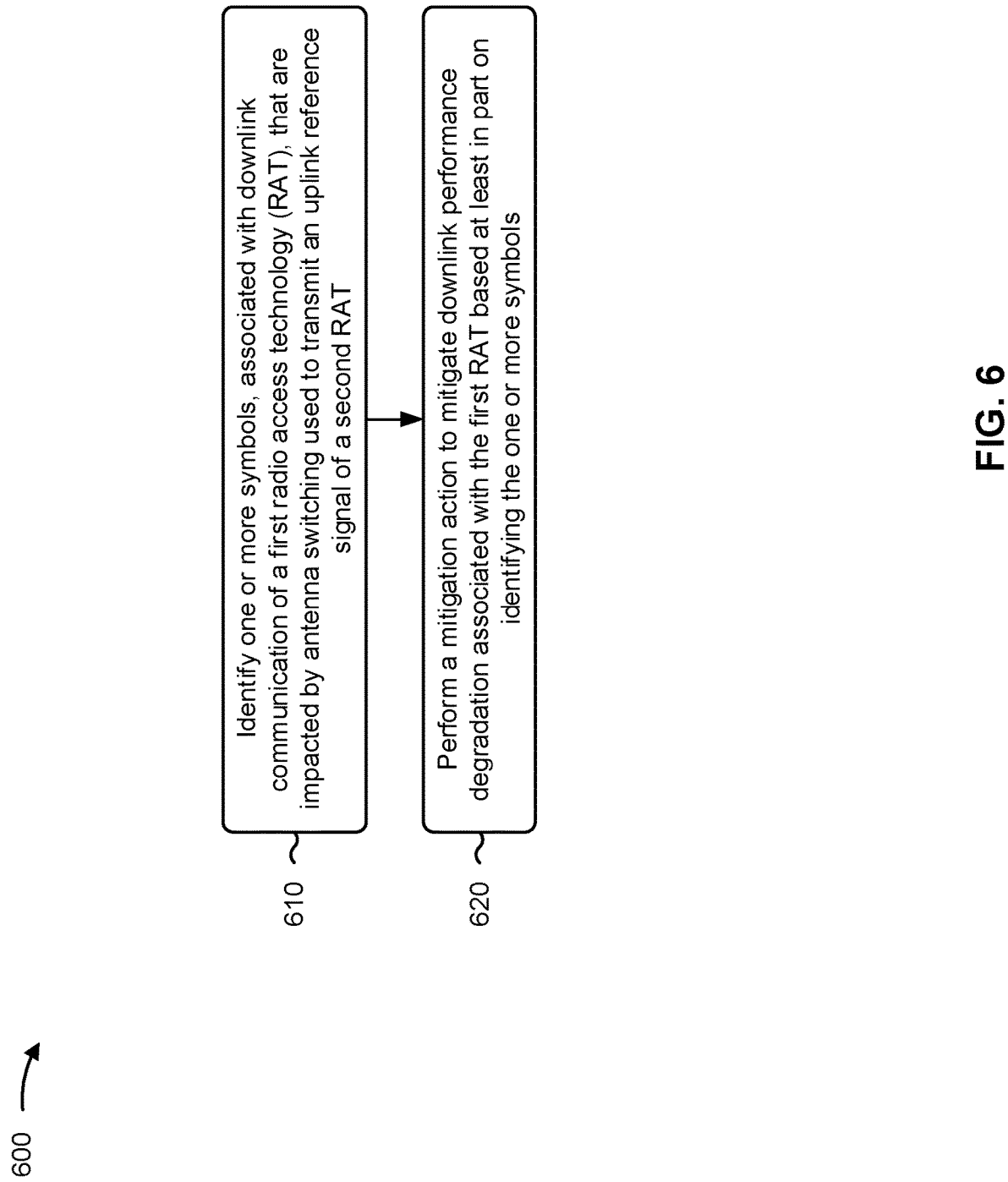
FIG. 6 is a diagram illustrating an example process associated with coexistence of NR sounding reference signal and LTE communications, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with coexistence of NR-SRS and LTE communications.

As shown in FIG. 6, in some aspects, process 600 may include identifying one or more symbols, associated with downlink communication of a first RAT, that are impacted by antenna switching used to transmit an uplink reference signal of a second RAT (block 610). For example, the UE (e.g., using identification component 708, depicted in FIG. 7) may identify one or more symbols, associated with downlink communication of a first RAT, that are impacted by antenna switching used to transmit an uplink reference signal of a second RAT, as described above.

As further shown in FIG. 6, in some aspects, process 600 may include performing a mitigation action to mitigate downlink performance degradation associated with the first RAT based at least in part on identifying the one or more symbols (block 620). For example, the UE (e.g., using mitigation component 710, depicted in FIG. 7) may perform a mitigation action to mitigate downlink performance degradation associated with the first RAT based at least in part on identifying the one or more symbols, as described above.

Process 600 may include additional aspects, such as any single aspect or any combination of aspects described below and/or in connection with one or more other processes described elsewhere herein.

In a first aspect, process 600 includes identifying (e.g., using identification component 708, depicted in FIG. 7) one or more antennas impacted by the antenna switching used to transmit the uplink reference signal of the second RAT, and performing the mitigation action to mitigate downlink performance degradation associated with the first RAT further comprises performing the mitigation action for the one or more antennas.

In a second aspect, alone or in combination with the first aspect, performing the mitigation action to mitigate downlink performance degradation comprises blanking one or more samples received in the one or more symbols.

In a third aspect, alone or in combination with one or more of the first and second aspects, performing the mitigation action to mitigate downlink performance degradation comprises modifying a channel estimate that is based at least in part on the one or more symbols.

In a fourth aspect, alone or in combination with one or more of the first through third aspects, modifying the channel estimate comprises modifying one or more weights assigned to one or more time domain interpolation coefficients, used to generate the channel estimate, associated with the one or more symbols.

In a fifth aspect, alone or in combination with one or more of the first through fourth aspects, the one or more weights are each set to zero.

In a sixth aspect, alone or in combination with one or more of the first through fifth aspects, performing the mitigation action to mitigate downlink performance degradation comprises refraining from estimating noise in the one or more symbols.

In a seventh aspect, alone or in combination with one or more of the first through sixth aspects, the one or more symbols include at least one CRS symbol, and wherein refraining from estimating noise in the one or more symbols comprises refraining from estimating noise in the at least one CRS symbol.

In an eighth aspect, alone or in combination with one or more of the first through seventh aspects, performing the mitigation action to mitigate downlink performance degradation comprises generating the channel estimate, using at least one of prediction, interpolation, or extrapolation, without using samples from the one or more symbols.

In a ninth aspect, alone or in combination with one or more of the first through eighth aspects, the one or more symbols include at least one CRS symbol, and wherein the channel estimate is generated using at least one of prediction, interpolation, or extrapolation, and without using samples from the one or more symbols based at least in part on a determination that the one or more symbols include the at least one CRS symbol.

In a tenth aspect, alone or in combination with one or more of the first through ninth aspects, process 600 includes identifying (e.g., using identification component 708, depicted in FIG. 7) the mitigation action to be performed based at least in part on whether the one or more symbols include a cell-specific reference signal symbol.

In an eleventh aspect, alone or in combination with one or more of the first through tenth aspects, performing the mitigation action to mitigate downlink performance degradation comprises at least one of performing a first mitigation action to mitigate downlink performance degradation in one or more data symbols of the one or more symbols, performing a second mitigation action to mitigate downlink performance degradation in one or more cell-specific reference signal symbols of the one or more symbols, or a combination thereof.

In a twelfth aspect, alone or in combination with one or more of the first through eleventh aspects, the UE is configured to communicate in a dual connectivity mode associated with the first RAT and the second RAT.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
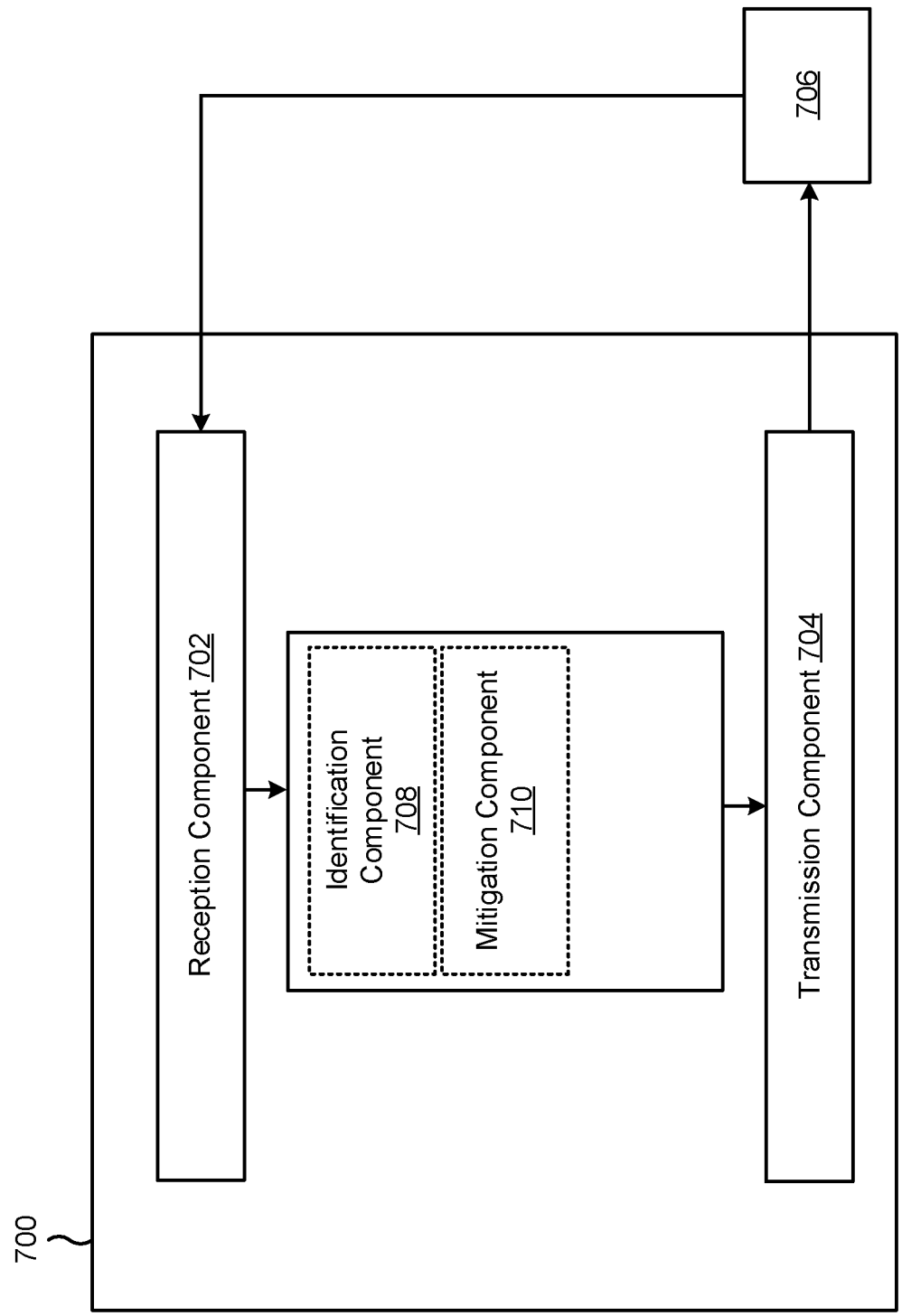
FIG. 7 is a block diagram of an example apparatus for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708 or a mitigation component 710, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The identification component 708 may identify one or more symbols, associated with downlink communication of a first RAT, that are impacted by antenna switching used to transmit an uplink reference signal of a second RAT. The mitigation component 710 may perform a mitigation action to mitigate downlink performance degradation associated with the first RAT based at least in part on identifying the one or more symbols.

In some aspects, the identification component 708 may identify one or more antennas impacted by the antenna switching used to transmit the uplink reference signal of the second RAT. In some aspects, the identification component 708 may identify the mitigation action to be performed based at least in part on whether the one or more symbols include a cell-specific reference signal symbol. In some aspects, the mitigation component 710 may perform a first mitigation action to mitigate downlink performance degradation in one or more data symbols of the one or more symbols, and/or may perform a second mitigation action to mitigate downlink performance degradation in one or more cell-specific reference signal symbols of the one or more symbols.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: identifying one or more symbols, associated with downlink communication of a first radio access technology (RAT), that are impacted by antenna switching used to transmit an uplink reference signal of a second RAT; and performing a mitigation action to mitigate downlink performance degradation associated with the first RAT based at least in part on identifying the one or more symbols.

Aspect 2: The method of aspect 1, further comprising identifying one or more antennas impacted by the antenna switching used to transmit the uplink reference signal of the second RAT; and wherein performing the mitigation action to mitigate downlink performance degradation associated with the first RAT further comprises performing the mitigation action for the one or more antennas.

Aspect 3: The method of any of the preceding aspects, wherein performing the mitigation action to mitigate downlink performance degradation comprises blanking one or more samples received in the one or more symbols.

Aspect 4: The method of any of the preceding aspects, wherein performing the mitigation action to mitigate downlink performance degradation comprises modifying a channel estimate that is based at least in part on the one or more symbols.

Aspect 5: The method of aspect 4, wherein modifying the channel estimate comprises modifying one or more weights assigned to one or more time domain interpolation coefficients, used to generate the channel estimate, associated with the one or more symbols.

Aspect 6: The method of aspect 5, wherein the one or more weights are each set to zero.

Aspect 7: The method of any of the preceding aspects, wherein performing the mitigation action to mitigate downlink performance degradation comprises refraining from estimating noise in the one or more symbols.

Aspect 8: The method of aspect 7, wherein the one or more symbols include at least one cell-specific reference signal (CRS) symbol; and wherein refraining from estimating noise in the one or more symbols comprises refraining from estimating noise in the at least one CRS symbol.

Aspect 9: The method of any of the preceding aspects, wherein performing the mitigation action to mitigate downlink performance degradation comprises generating the channel estimate, using at least one of prediction, interpolation, or extrapolation, without using samples from the one or more symbols.

Aspect 10: The method of aspect 9, wherein the one or more symbols include at least one cell-specific reference signal (CRS) symbol; and wherein the channel estimate is generated using at least one of prediction, interpolation, or extrapolation, and without using samples from the one or more symbols based at least in part on a determination that the one or more symbols include the at least one CRS symbol.

Aspect 11: The method of any of the preceding aspects, further comprising identifying the mitigation action to be performed based at least in part on whether the one or more symbols include a cell-specific reference signal symbol.

Aspect 12: The method of any of the preceding aspects, wherein performing the mitigation action to mitigate downlink performance degradation comprises at least one of: performing a first mitigation action to mitigate downlink performance degradation in one or more data symbols of the one or more symbols, performing a second mitigation action to mitigate downlink performance degradation in one or more cell-specific reference signal symbols of the one or more symbols, or a combination thereof.

Aspect 13: The method of any of the preceding aspects, wherein the UE is configured to communicate in a dual connectivity mode associated with the first RAT and the second RAT.

Aspect 14: An apparatus for wireless communication at a device, comprising a processor; memory coupled with the processor; and instructions stored in the memory and executable by the processor to cause the apparatus to perform the method of one or more aspects of aspects 1-13.

Aspect 15: A device for wireless communication, comprising a memory and one or more processors coupled to the memory, the memory and the one or more processors configured to perform the method of one or more aspects of aspects 1-13.

Aspect 16: An apparatus for wireless communication, comprising at least one means for performing the method of one or more aspects of aspects 1-13.

Aspect 17: A non-transitory computer-readable medium storing code for wireless communication, the code comprising instructions executable by a processor to perform the method of one or more aspects of aspects 1-13.

Aspect 18: A non-transitory computer-readable medium storing a set of instructions for wireless communication, the set of instructions comprising one or more instructions that, when executed by one or more processors of a device, cause the device to perform the method of one or more aspects of aspects 1-13.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying one or more symbols, associated with downlink communication of a first radio access technology (RAT), that are impacted by antenna switching used to transmit an uplink reference signal of a second RAT; and
    performing a mitigation action to mitigate downlink performance degradation associated with the first RAT based at least in part on identifying the one or more symbols,
        wherein performing the mitigation action to mitigate downlink performance degradation comprises at least one of:
            modifying a first channel estimate that is based at least in part on the one or more symbols, or
            generating a second channel estimate using at least one of prediction, interpolation, or extrapolation and without using samples from the one or more symbols.

2. The method of claim 1, further comprising identifying one or more antennas impacted by the antenna switching used to transmit the uplink reference signal of the second RAT; and wherein performing the mitigation action further comprises performing the mitigation action for the one or more antennas.

3. The method of claim 1, wherein performing the mitigation action to mitigate downlink performance degradation further comprises blanking one or more samples received in the one or more symbols.

4. The method of claim 1, wherein modifying the first channel estimate comprises modifying one or more weights assigned to one or more time domain interpolation coefficients, used to generate the first channel estimate, associated with the one or more symbols.

5. The method of claim 4, wherein the one or more weights are each set to zero.

6. The method of claim 1, wherein performing the mitigation action to mitigate downlink performance degradation further comprises refraining from estimating noise in the one or more symbols.

7. The method of claim 6, wherein the one or more symbols include at least one cell-specific reference signal (CRS) symbol; and
wherein refraining from estimating noise in the one or more symbols comprises refraining from estimating noise in the at least one CRS symbol.

8. The method of claim 1, wherein the one or more symbols include at least one cell-specific reference signal (CRS) symbol; and
wherein the second channel estimate is generated based at least in part on a determination that the one or more symbols include the at least one CRS symbol.

9. The method of claim 1, further comprising identifying the mitigation action to be performed based at least in part on whether the one or more symbols include a cell-specific reference signal symbol.

10. The method of claim 1, wherein performing the mitigation action to mitigate downlink performance degradation further comprises at least one of:
performing a first mitigation action to mitigate downlink performance degradation in one or more data symbols of the one or more symbols, or
performing a second mitigation action to mitigate downlink performance degradation in one or more cell-specific reference signal symbols of the one or more symbols.

11. The method of claim 1, wherein the UE is configured to communicate in a dual connectivity mode associated with the first RAT and the second RAT.

12. A user equipment (UE) for wireless communication, comprising:
one or more memories; and
one or more processors operatively coupled to the one or more memories, the one or more processors configured to:
identify one or more symbols, associated with downlink communication of a first radio access technology (RAT), that are impacted by antenna switching used to transmit an uplink reference signal of a second RAT; and
perform a mitigation action to mitigate downlink performance degradation associated with the first RAT based at least in part on identifying the one or more symbols,
wherein the one or more processors, to perform the mitigation action to mitigate downlink performance degradation, are configured to at least one of:
modify a first channel estimate that is based at least in part on the one or more symbols, or
generate a second channel estimate using at least one of prediction, interpolation, or extrapolation and without using samples from the one or more symbols.

13. The UE of claim 12, wherein the one or more processors are further configured to identify one or more antennas impacted by the antenna switching used to transmit the second RAT; and
wherein the one or more processors, to perform the mitigation action, are configured to perform the mitigation action for the one or more antennas.

14. The UE of claim 12, wherein the one or more processors, to perform the mitigation action to mitigate downlink performance degradation, are configured to blank one or more samples received in the one or more symbols.

15. The UE of claim 12, wherein the one or more processors, to modify the first channel estimate, are configured to modify one or more weights assigned to one or more time domain interpolation coefficients, used to generate the first channel estimate, associated with the one or more symbols.

16. The UE of claim 15, wherein the one or more weights are each set to zero.

17. The UE of claim 12, wherein the one or more processors, to perform the mitigation action to mitigate downlink performance degradation, are configured to refrain from estimating noise in the one or more symbols.

18. The UE of claim 17, wherein the one or more symbols include at least one cell-specific reference signal (CRS) symbol; and
wherein the one or more processors, to refrain from estimating noise in the one or more symbols, are configured to refrain from estimating noise in the at least one CRS symbol.

19. The UE of claim 14, wherein the one or more symbols include at least one cell-specific reference signal (CRS) symbol; and
wherein the second channel estimate is generated based at least in part on a determination that the one or more symbols include the at least one CRS symbol.

20. The UE of claim 12, wherein the one or more processors are further configured to identify the mitigation action to be performed based at least in part on whether the one or more symbols include a cell-specific reference signal symbol.

21. The UE of claim 12, wherein the one or more processors, to perform the mitigation action to mitigate downlink performance degradation, are further configured to:
perform a first mitigation action to mitigate downlink performance degradation in one or more data symbols of the one or more symbols,
perform a second mitigation action to mitigate downlink performance degradation in one or more cell-specific reference signal symbols of the one or more symbols, or
a combination thereof.

22. The UE of claim 12, wherein the UE is configured to communicate in a dual connectivity mode associated with the first RAT and the second RAT.

23. A non-transitory computer-readable medium storing a set of instructions for wireless communication, the set of instructions comprising:

one or more instructions that, when executed by one or more processors of a user equipment (UE), cause the UE to:

identify one or more symbols, associated with downlink communication of a first radio access technology (RAT), that are impacted by antenna switching used to transmit an uplink reference signal of a second RAT using antenna switching; and perform a mitigation action to mitigate downlink performance degradation associated with the first RAT based at least in part on identifying the one or more symbols, wherein the one or more instructions, that cause the UE to perform the mitigation action to mitigate downlink performance degradation, cause the UE to at least one of:

modify a first channel estimate that is based at least in part on the one or more symbols, or generate a second channel estimate using at least one of prediction, interpolation, or extrapolation and without using samples from the one or more symbols.

24. The non-transitory computer-readable medium of claim 23, wherein the one or more instructions further cause the UE to identify one or more antennas impacted by the antenna switching used to transmit the uplink reference signal of the second RAT; and wherein the one or more instructions, that cause the UE to perform the mitigation action, cause the UE to perform the mitigation action for the one or more antennas.

25. The non-transitory computer-readable medium of claim 23, wherein the one or more instructions, that cause the UE to perform the mitigation action to mitigate downlink performance degradation, further cause the UE to at least one of:

blank one or more samples received in the one or more symbols, or refrain from estimating noise in the one or more symbols.

26. The non-transitory computer-readable medium of claim 23, wherein the one or more instructions, that cause the UE to modify the first channel estimate, further cause the UE to modify one or more weights assigned to one or more time domain interpolation coefficients, used to generate the first channel estimate, associated with the one or more symbols.

27. The non-transitory computer-readable medium of claim 26, wherein the one or more weights are each set to zero.

28. The non-transitory computer-readable medium of claim 23, wherein the one or more symbols include at least one cell-specific reference signal (CRS) symbol; and wherein the one or more instructions, that cause the UE to generate the second channel estimate, further cause the UE to generate the second channel estimate based at least in part on a determination that the one or more symbols include the at least one CRS symbol.

29. The non-transitory computer-readable medium of claim 23, wherein the one or more instructions further cause the UE to identify the mitigation action to be performed based at least in part on whether the one or more symbols include a cell-specific reference signal symbol.

30. An apparatus for wireless communication, comprising:

means for identifying one or more symbols, associated with downlink communication of a first radio access technology (RAT), that are impacted by antenna switching used to transmit an uplink reference signal of a second RAT; and means for performing a mitigation action to mitigate downlink performance degradation associated with the first RAT based at least in part on identifying the one or more symbols, wherein the means for performing the mitigation action to mitigate downlink performance degradation comprises at least one of:

means for modifying a first channel estimate that is based at least in part on the one or more symbols, or means for generating a second channel estimate using at least one of prediction, interpolation, or extrapolation and without using samples from the one or more symbols.

* * * * *